United States Patent [19]

Dotson et al.

[11] Patent Number: 5,131,989

[45] Date of Patent: Jul. 21, 1992

[54] PROCESS FOR PRODUCING PERCHLORIC ACID AND AMMONIUM PERCHLORATE

[75] Inventors: Ronald L. Dotson; Richard W. Ralston, Jr.; Harry J. Loftis, all of Cleveland, Tenn.

[73] Assignee: Olin Corporation, Cheshire, Conn.

[21] Appl. No.: 703,437

[22] Filed: May 17, 1991

[51] Int. Cl.$^5$ ............................ C25B 1/26; C25B 1/28
[52] U.S. Cl. ........................................ 204/82; 204/95
[58] Field of Search ................. 423/476, 386, 462; 204/82, 95

[56] References Cited

U.S. PATENT DOCUMENTS

| | | | |
|---|---|---|---|
| 3,288,560 | 11/1965 | Gale et al. | 423/476 |
| 3,307,903 | 3/1967 | Lazari | 423/476 |
| 4,146,578 | 3/1979 | Brennan et al. | 423/473 |
| 5,004,527 | 4/1991 | Millet et al. | 204/82 |

FOREIGN PATENT DOCUMENTS 2332938 1/1975 Fed. Rep. of Germany .
WO90/05111 5/1990 PCT Int'l Appl. .

OTHER PUBLICATIONS

U.S. Ser. No. 674,825, filed Mar. 22, 1991 by David W. Cawlfield, Ronald L. Dotson, Budd L. Duncan, Sudhir K. Mendiratta and Kenneth E. Woodard, Jr.

"Electrochemical Production of Perchloric Acid on Tantalum-Platinum Bianodes" by I. B. Shimonis, A. A. Rakov and V. I. Vaselovskii. *Elektrokhimiya* 1970 6(7) pp. 1073-1075.

"Encyclopedia of Explosives and Related Items" by Seymour M. Kaye. PATR 2700 vol. 8 (1978) *US Army Armament Research & Development Command*, Large Caliber Weapon Systems Laboratory, Dover, N.J., pp. 140-152.

"The Preparation of Perchloric Acid" by H. H. Willard, *Journal American Chemical Society* vol. 34 (1912) at pp. 1480-1485.

"Perchlorates of the Alkali and Alkaline Earth Metals and Ammonium. Their Solubility in Water and Other Solvents" by H. H. Willard and G. Frederick Smith, *Journal American Chemical Soc.*, vol. 45 (1923) pp. 286-297.

Udupa, H. V. K. et al., in *Indian J. Technology*, #12, vol. 8, pp. 458-463 (Dec. 1970).

*Primary Examiner*—Michael Lewis
*Assistant Examiner*—Stuart L. Hendrickson
*Attorney, Agent, or Firm*—Allen A. Meyer, Jr.; Paul Weinstein

[57] ABSTRACT

Ammonium perchlorate is produced a process which comprises:
 (a) oxidizing a solution of chloric acid substantially free of ionic impurities,
 (b) introducing gaseous ammonia or an ammonium hydroxide solution into the crystallizing zone to produce ammonium perchlorate crystals, wherein the aqueous solution of perchloric acid and/or the ammonium hydroxide solution is in droplet form.

High purity ammonium perchlorate crystals can now be produced directly which are free of transition metals, sulfates and phosphates, as well as substantially free of other ionic impurities including alkali metals, chlorate and chloride.

8 Claims, 3 Drawing Sheets 5,131,989

PROCESS FOR PRODUCING PERCHLORIC ACID AND AMMONIUM PERCHLORATE

FIELD OF THE INVENTION

This invention is related to the production of perchloric acid and ammonium perchlorate. More particularly, this invention is related to the production of ammonium perchlorate from high purity perchloric acid.

BACKGROUND OF THE INVENTION

The commercial production of ammonium perchlorate is carried out in a process which reacts anhydrous ammonia, concentrated aqueous hydrochloric acid and concentrated sodium perchlorate solutions. Because of its strong oxidizing power and chemical stability, ammonium perchlorate (AP) provides a reliable means of high-energy oxidation under controlled conditions. It is especially useful when employed in a composite propellent with plastic fuel binders. In this application, it currently dominates the field as the oxidizer of choice in high performance, solid propellants.

The pH of the reaction mixture is maintained close to neutral as it is fed into a crystallizer. The reaction mixture, maintained at a temperature of about 35° C., is passed through a vaporizer which produces a super-saturated solution. The super-saturated solution is fed through a bed of ammonium perchlorate crystals where the excess crystallizers. The ammonium perchlorate slurry formed is fed to a centrifuge where the mother liquor is removed and recycled to the crystallizer. The AP crystals are washed and dumped into a saturated solution of ammonium perchlorate which removes the last traces of chloride. Ammonium perchlorate crystals are then separated and dried. When used as a solid propellant, the key requirements for ammonium perchlorate are burn rate, product purity and stability. Impurities present impact crystal growth, product stability and overall process economics. Product purity is so important that current commercial processes, due to the extensive purification steps involved, operate at low efficiences in order to produce a highly pure product. However, ammonium perchlorate produced by current technology contains 15-400 parts per million of sodium as well as many other metallic and non-metallic impurities in the finished product.

U.S. Pat. No. 3,307,903 published Mar. 7, 1967 by F. Lazari teaches a process for preparing ammonium perchlorate in a solution crystallization process in which gaseous ammonia is introduced to neutralize a perchloric acid solution to form a saturated solution of $NH_4ClO_4$ which is fed to a crystallization vessel. The perchloric acid is prepared by the reaction of sodium perchlorate with sulfuric acid with the reaction mixture being distilled under vacuum to recover a solution of perchloric acid.

BRIEF SUMMARY OF THE INVENTION

It has been discovered that extremely high purity ammonium perchlorate can be made by the reaction of an ammonia compound with aqueous perchloric acid in a gas phase crystallization process. Ammonium perchlorate crystals can now be produced directly which are free of transition metals, sulfates and phosphates, as well as substantially free of other ionic impurities including alkali metals, chlorate or chloride.

High purity ammonium perchlorate is produced in a process for producing ammonium perchlorate which comprises:

(a) introducing an aqueous solution of perchloric acid into a crystallizing zone, (b) introducing gaseous ammonia or an ammonium hydroxide solution into the crystallizing zone to produce ammonium perchlorate crystals, wherein the perchloric acid and/or the ammonium hydroxide solution is in droplet form.

Now it has been found that perchloric acid can be produced directly by electrolytic oxidation in a process in which metal ion impurities are absent. The process does not require additives and all of the chlorine species present in the electrolyte are converted to perchloric acid. The process can be operated with high current loads at low voltages and increased current effeciencies to produce perchloric acid at reduced capital and operating costs. Because the product is of a very high purity, further purification or other treatment steps such as the addition of acid are not required. The process can employ higher temperatures which vaporize water to concentrate the perchloric acid during cell operation.

Figure 3:
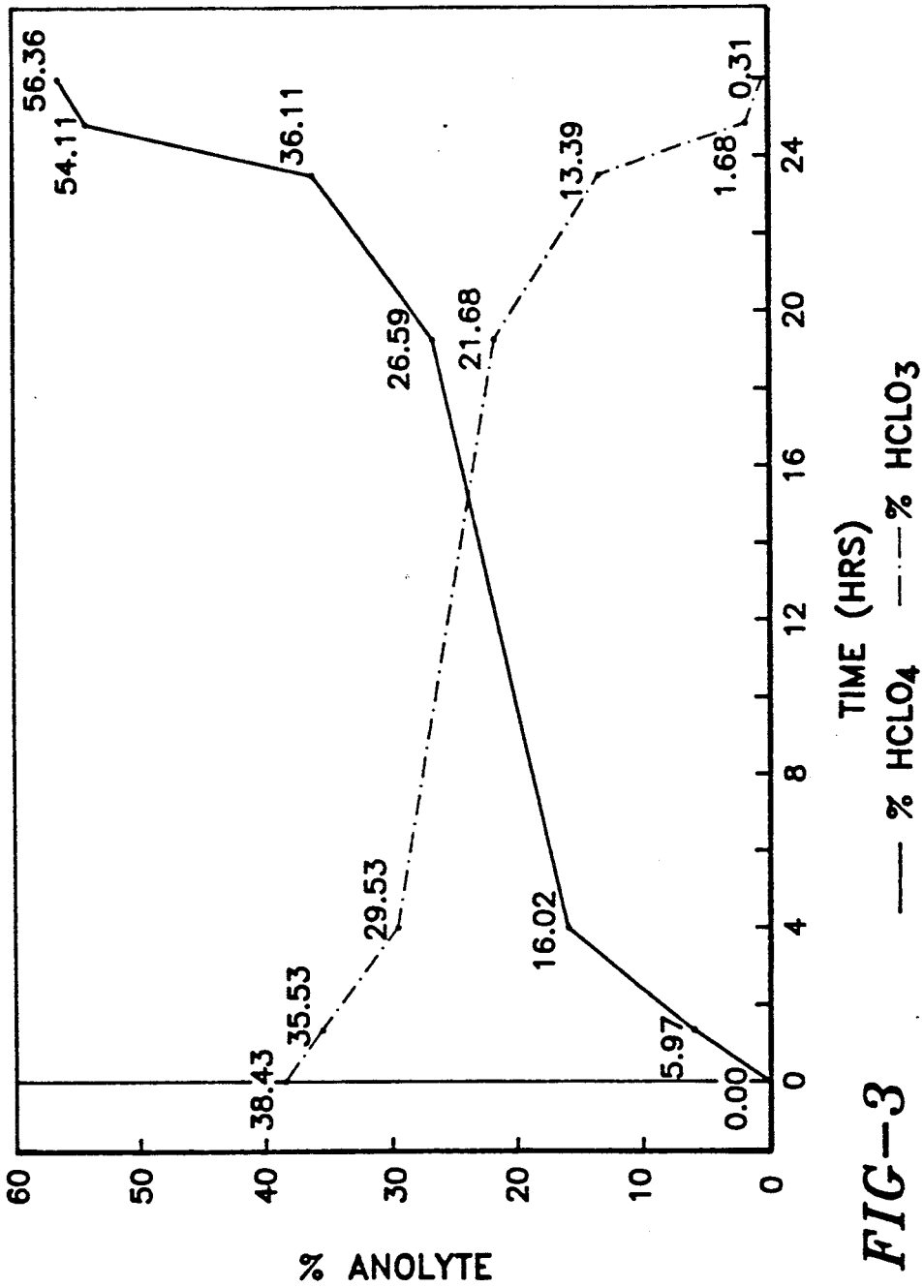

The production of perchloric acid by the electrolysis of high purity chloric acid using the embodiment of Example 1 is graphically illustrated in FIG. 3.

DETAILED DESCRIPTION OF THE DRAWINGS

Figure 1:
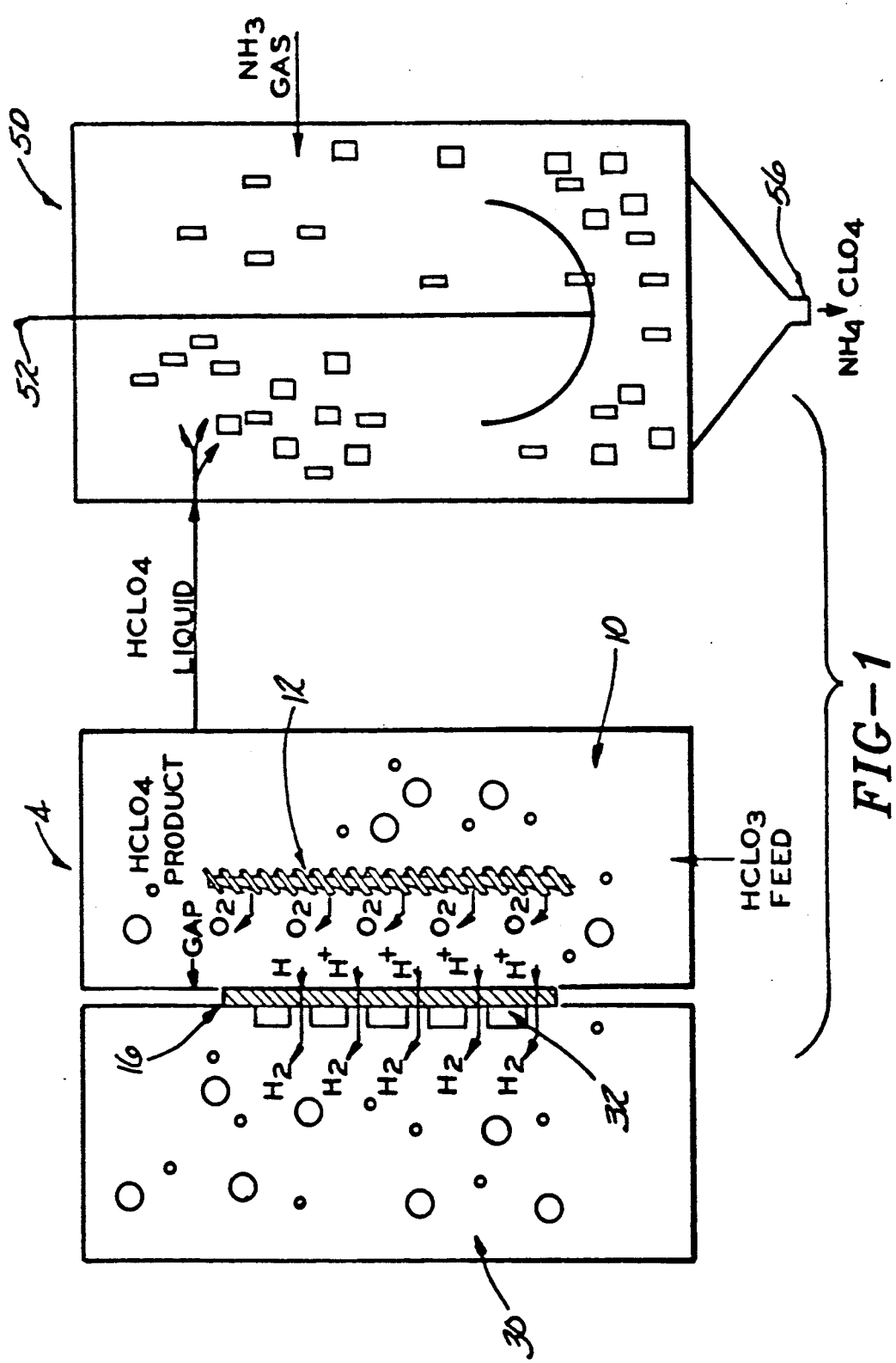
FIG. 1 schematically illustrates one embodiment of the novel process of the present invention.

FIG. 1 shows an electrolytic cell 4 divided into anode compartment 10 and cathode compartment 30 by cation permeable ion exchange membrane 16. Anode compartment 10 includes anode 12 which is spaced apart from cation permeable ion exchange membrane 16. Cathode compartment 30 includes cathode 32 which is placed in contact with cation permeable ion exchange membrane 16. The chloric acid solution is fed to anode compartment 10 of electrolytic cell 4. Following electrolysis, the perchloric acid solution produced is passed to and fed in droplet form into crystallizer 50. Also fed to crystallizer 50 is an ammonia compound such as ammonia gas which reacts with the droplets of perchloric acid to produce ammonium perchlorate crystals. Crystallizer 50 contains agitator 52 for aiding in mixing the reactants. Crystallizer 50 has an outlet (not shown) for removing water vapor generated during the reaction. Ammonium perchlorate crystals are removed thru outlet 56.

Figure 2:
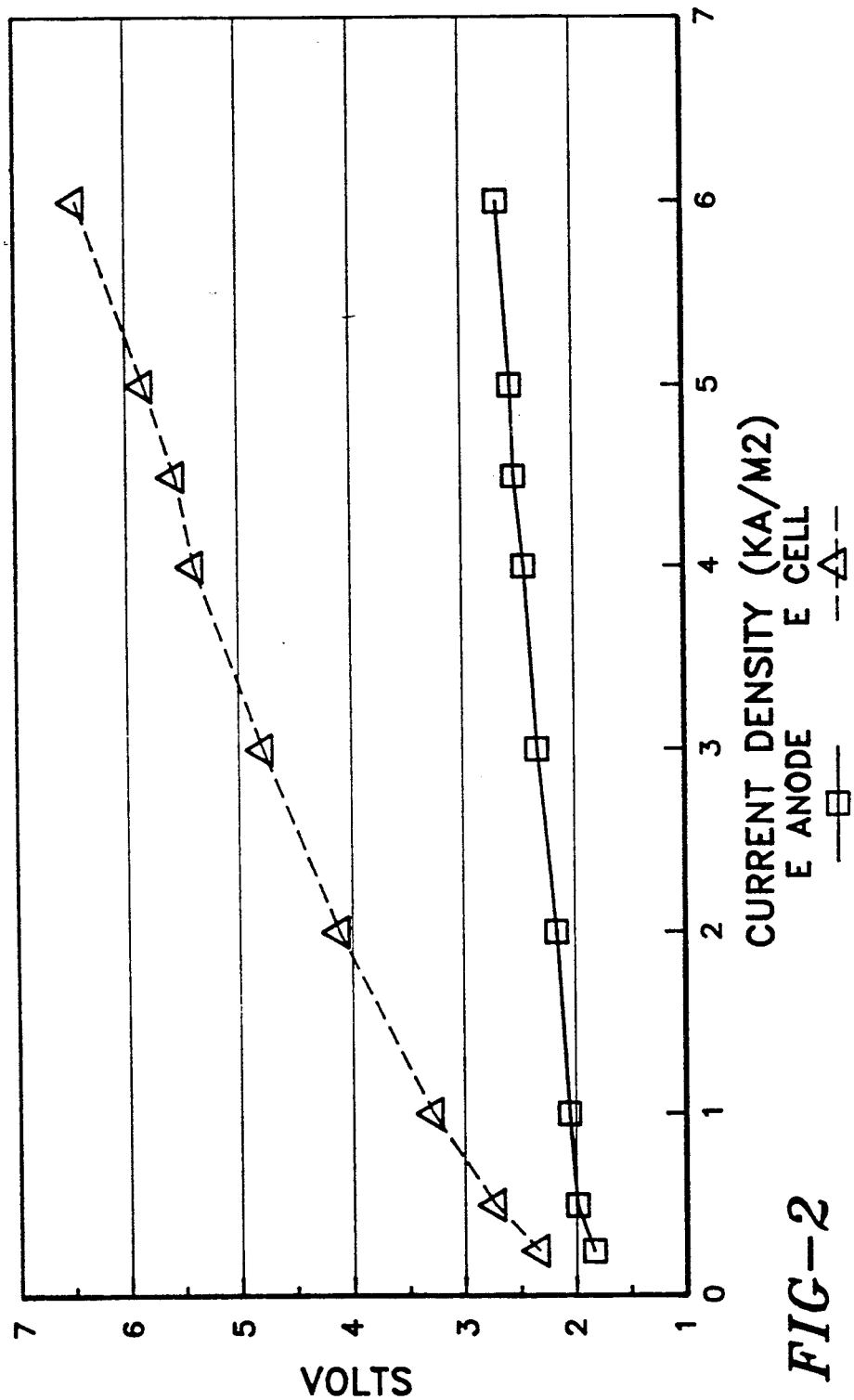
FIG. 2 depicts a graph of the cell voltage at selected current densities for the electrochemical production of perchloric acid from chloric acid.

A cell voltage curve is plotted in FIG. 2 for a series of current densities employed in the anodic oxidation of a 40% solution chloric acid to directly produce an aqueous solution of perchloric acid.

DETAILED DESCRIPTION OF THE INVENTION

The novel process of the present invention employs as the starting material a solution of high purity perchloric acid, $HClO_4$. The starting material, perchloric acid has been produced previously by the electrochemical oxidation of alkali metal chlorates in an electrochemical cell without a separator between the anode and the cathode. The chlorate solutions, having a pH in the range of 6-7, are electrolyzed at low temperatures, i.e. 30°-45° C., and at current densities of about 3 KA/m² where the cell voltage is in the range of 6.5 to 7. The process requires the addition of a salt such as an alkali metal chromate or dichromate to minimize cathodic reduction of the perchlorate ions formed. The alkali metal perchlorate solution produced is removed from the cell and fed to a tank where it is treated with an acid which converts the perchlorate to perchloric acid and forms a removable salt by-product. These prior art processes are energy inefficient and require multiple processing steps to isolate and purify the perchloric acid by removing chromates as well as cations such as chromium, sodium, potassium and ammonium, for example, by treatment with ion exchange resins.

A method of directly producing high purity perchloric acid initially begins with high purity chloric acid, $HClO_3$, solutions. High purity chloric acid solutions which are substantially free of ionic impurities such as metal ions and chloride ions can be produced by the oxidation of high purity hypochlorous acid solutions. One process suitable for producing the chloric acid heats the hypochlorous acid solution at a temperature in the range of from about 25° to about 120° C. and recovers a solution of chloric acid.

This process is represented by the following reactions:

$$3HOCl \longrightarrow HClO_3 + 2HCl \quad (1)$$

$$2HOCl + 2HCl \longrightarrow 2Cl_2 + 2H_2O \quad (2)$$

$$5HOCl \longrightarrow HClO_3 + 2Cl_2 + 2H_2O \quad (3)$$

Another process for producing the high purity chloric acid utilizes anodic oxidation of hypochlorous in an electrolytic cell having an anode compartment, a cathode compartment, and an cation exchange membrane separating the anode compartment from the cathode compartment. In operation, the process includes feeding an aqueous solution of hypochlorous acid to the anode compartment, and electrolyzes the aqueous solution of hypochlorous solution at a temperature of from about 0° to about 40° C. to produce a chloric acid solution.

The process is represented by the following equation:

$$HOCl + 2H_2O \rightarrow HClO_3 + 4H^+ + 4e^- \quad (4)$$

High purity HOCl solutions to be used in the production of chloric acid are produced by a process in which gaseous mixtures, having high concentrations of hypochlorous acid vapors and chlorine monoxide (dichlorine monoxide, $Cl_2O$) gas and controlled amounts of water vapor are generated, for example, by the process described by J. P. Brennan et al in U.S. Pat. No. 4,146,578, issued Mar. 27, 1979, or WO 90/05111 published May 17, 1990 by J. K. Melton, et. al. Each of these disclosures are incorporated in their entirety by reference.

Hypochlorous acid solutions produced by these processes contain concentrations of from about 35 to about 60, and more preferably from about 40 to about 55 percent by weight of HOCl. The hypochlorous acid solutions are substantially free of ionic impurities such as chloride ions and alkali metal ions as well as metal ions such as nickel and copper or mercury, among others.

Chloric acid solutions suitable for use in the process of the present invention prepared by either of the processes for oxidizing hypochlorous acid described above are substantially free of ionic impurities i.e. metal ions, including alkali metal ions, and chloride ions. Suitable chloric acid solutions include those in the range of from about 10 to about 50 percent, preferably from about 30 to about 50, and more preferably from about 30 to about 40 percent by weight of $HClO_3$.

In the novel process of the present invention the high purity chloric acid is oxidized to perchloric acid. One process for producing perchloric acid reacts the chloric acid with an oxygen-containing gas such as ozone. The reaction is believed to be represented by the following equation:

$$3HClO_3 + O_3 \rightarrow 3HClO_4 \quad (5)$$

In a preferred embodiment, the chloric acid is fed as the anolyte to the anode compartment of an electrolytic cell which includes a cathode compartment, the anode compartment, and a separator such as a cation exchange membrane positioned between the anode compartment and the cathode compartment.

During cell operation the temperature of the chloric acid solution in the range of from about 40° to about 95° C., and preferably from about 45° to about 80° C.

An electrolytic cell as illustrated in FIG. 1 with membrane-cathode contact provides electrical continuity for proton transport from the anode chamber across the membrane and discharge on the back side of the open cathode surface. The cathode reaction is believed to be represented by the following equation:

$$2e^- + 2H^+ \rightarrow H_2 \quad (6)$$

This "zero cathode gap" permits the cell to be operated at very high current densities while operating at surprisingly low voltages.

The anode is spaced apart from the membrane a sufficient distance to provide an anode-membrane gap which allows nascent oxygen generated to react with the chloric acid anolyte. The anode reactions are believed to be represented by the following equations:

$$H_2O \rightarrow OH^- + H^+ \rightarrow O + 2H^+ + 2e^- \quad (7)$$

$$HClO_3 + O \rightarrow HClO_4 \quad (8)$$

Suitable anode membrane gaps are those up to a few centimeters, for example, gaps on the order of about 0.05 to about 4 centimeters, and preferably from about 0.1 to about 2 centimeters. Maintenance of the anode to membrane gap can be accomplished, for example, by operating the cell with a higher pressure in the anode compartment than the cathode compartment, or by placing a fine non-conductive porous spacer between the anode and the membrane. The anolyte is rich in hydrogen ions (protons) which are transported or tunnelled through the cation exchange membrane which separates the anode compartment from the cathode compartment.

During cell operation the anode potential is maintained at a level sufficient to generate nascent oxygen. While the anode potential may vary with the concentration of perchloric acid produced, the anode potential should be 2 volts or greater, preferably in the range of from about 2.4 to about 2.9 volts. Current densities employed include those in the range of from about 2 to about 12 KA/m$^2$, and preferably from about 4 to about 10 KA/m$^2$. To achieve high current efficiencies at high current densities while maintaining low cell voltages, the anode structure is selected to provide low surface areas, being substantially flat and smooth. The anode surface is of a material which provides a high oxygen overvoltage, and additionally must be stable in the highly acidic and oxidative chloric acid media. Materials which can be employed in the anode structures include platinum and platinum group metals, metal substrates coated with platinum or platinum group metals, platinum group metal coated substrates, glassy carbon, fluorinated carbons, lead dioxide and metal substrates coated with lead dioxide, noble metal oxides, and metal substrates coated with noble metal oxides. Suitable metal substrates include valve metals such as titanium and niobium among others. Especially useful as an anode is a platinum coated niobium expanded metal having, for example, 100–200 mils of platinum metal bonded to the niobium substrate.

The cathode is placed in contact with the ion exchange membrane to minimize interference of hydrogen ion (proton) transfer to the back side of the cathode to produce hydrogen gas. Any suitable materials which readily evolve hydrogen gas in an acidic media may be employed in the cathode such as graphite or carbon, stainless steel, nickel alloys, platinum group metals, metals plated with platinum group metals, lead dioxide, etc. The cathode material should be insoluble in the acidic catholyte media while under current load, and preferably insoluble without cathodic protection. A preferred cathode is a perforated Hastelloy ® metal plate or mesh.

As the catholyte, any suitable electrolyte may be employed such as a mineral acid i.e., sulfuric acid, phosphoric acid, or hydrochloric acid, as well as deionized water. In one embodiment, the catholyte contains particles of a solid state acid such as a perfluorosulfonic acid resin (sold commercially by E. I. DuPont de Nemours & Company, Inc., under the trademark "NAFION") to increase the conductivity of the catholyte. When using a solid state acid as the catholyte, small amounts of hydrochloric acid are added to the cathode compartment.

Similarly, small concentrations of an electrolyte such as chloric acid may be present in the catholyte to improve the conductivity of the catholyte.

The cation exchange membrane selected as a separator between the anode and cathode compartments is a chemically stable membrane which is substantially impervious to the hydrodynamic flow of the electrolytes and the passage of any gas products produced in the anode or cathode compartments.

Cation exchange membranes are well-known to contain fixed anionic groups that permit intrusion and exchange of cations, and exclude anions from an external source. Generally the resinous membrane or diaphragm has as a matrix, a cross-linked polymer, to which are attached charged groups such as $-SO_3^{-2}$. The resins which can be used to produce the membranes include, for example, fluorocarbons, vinyl compounds, polyolefins, hydrocarbons, and copolymers thereof. Preferred are cation exchange membranes such as those comprised of fluorocarbon polymers having a plurality of pendant sulfonic acid groups and/or phosphonic acid groups. The term "sulfonic acid group" is meant to include compounds of sulfonic acid which when hydrolyzed produce sulfonic acid such as sulfonyl chloride and sulfonyl fluoride. Similarly, the term "phosphonic acid group" is meant to include compounds which when hydrolyzed produce phosphonic acid.

During the process hydrogen ions are generated in the anode compartment which pass thru the cation exchange membrane into the cathode compartment. Oxygen gas which is also produced is removed from the anode compartment.

Perchloric acid solutions produced by the process of the invention have a high degree of purity and can include concentrations of up to 70 percent by weight of HClO$_4$. While any concentration of perchloric acid may be fed to the crystallizing zone, to minimize the energy requirements for vaporizing water present in the solution, it is preferred to employ perchloric acid solutions containing at least 30 percent, and preferably at least 50 percent by weight of HClO$_4$. Solutions produced by the process of the invention may be concentrated prior to their reaction with ammonia.

The second reactant in the novel process of the present invention is an ammonia compound. Suitable as ammonia compounds are anhydrous or gaseous ammonia or ammonium hydroxide solutions. Where the ammonium perchlorate product is to be used in propellant applications, to minimize impurities, high purity ammonia compounds are employed. Suitable for use are the Commercial (fertilizer), Refrigeration, and Metallurgical grades of anhydrous ammonia; and the Reagent and Electronic grades of ammonium hydroxide.

Where anhydrous or gaseous ammonia is used as the ammonia compound, the perchloric acid solution is introduced into the crystallizing zone in droplet form to control the size of the crystals of ammonium perchlorate produced. When ammonium hydroxide is used as the ammonia compound, either ammonium hydroxide or perchloric acid or both reactants are fed to the crystallizing zone in droplet form. Droplet sizes are selected which permit a substantially complete reaction of the perchloric acid solution with the ammonia compound. Droplets having an average diameter in the range of from about 1 to about 100 microns produce ammonium perchlorate crystals having reduced requirements for crystal size reduction. Where required, crystal size reduction is accomplished by employing one of the known methods used for ammonium perchlorate crystals.

Any atomization technique capable of providing droplets of liquid reactants may be employed to feed the perchloric acid and/or ammonium hydroxide to the crystallizing zone.

Typical atomizing techniques of the pneumatic, hydraulic, and spinning disc type, among others, which are suitable for use in the process of this invention, are described in the monograph entitled "Atomization and Spray Graining" by W. R. Marshall, Jr., Chemical Engineering Progress Monograph Series, No. 2, Volume 50, 1954. An inert gas, such as air, nitrogen or mixtures thereof, under pressure may be used to atomize droplets of the perchloric acid solution by premixing before discharge from the nozzle, or the liquid droplets and chlorine gas are mixed after discharge from their respective nozzles.

The reactants are fed to the crystallizer to provide at least the stoichiometric proportion required by the reaction illustrated by the following Equation:

$$NH_3 + HClO_4 \rightarrow NH_4ClO_4 \quad (9)$$

Preferably a stoichiometric excess of ammonia compound above that proportion necessary to produce ammonium perchlorate is employed. For example an excess of ammonia compound of from about 1 to about 10, and preferably from 1 to about 2 times the stoichiometric proportion is employed as a reactant.

The reaction is carried out under conditions which will vaporize or remove the water present in the reaction mixture. For example, reaction temperatures up to about the boiling point of water may be used at substantially atmospheric pressures or a vacuum and lower temperatures may be employed.

The hot gaseous reaction mixture removed from the crystallizer contains ammonia, water vapor and may contain entrained fine crystals of ammonium perchlorate. Where present, the fine crystals of ammonium perchlorate may be removed by any suitable separation means, for example, by passing the gaseous mixture through a gas filter medium or through a solid separator such as a cyclone, a baghouse or the like.

In one embodiment, after removal of any entrained ammonium perchlorate crystals, the ammonia-containing gas is fed to a condenser where most of the water and some of the ammonia is removed as a solution of ammonium hydroxide.

To reduce or minimize the concentration of ammonia where the ammonia-containing gas is condensed, an inert gas such as air or nitrogen may be added to the ammonia-containing gas.

The ammonia-containing gas recovered either from the solids separator means or from a condenser is then heated to maintain the water present as steam or water vapor where the ammonia-containing gas is to be recycled to the crystallizer.

In an alternate embodiment, wet crystals of ammonium perchlorate are removed from the crystallizer, the water separated and the crystals dried. As the water contains traces of impurities, its separation provides a purer product.

The novel process of the present invention is further illustrated by the following examples with no intention of being limited thereby. All parts and percentages are by weight unless otherwise indicated.

EXAMPLE 1

Chloric acid (38.43 percent by weight of $HClO_3$) was fed to the anode compartment of an H-type electrolytic membrane cell illustrated in FIG. 1 in which the cation exchange membrane was Nafion® 117 (E. I. Dupont de Nemours & Company). The electrodes employed in the cell were a platinum coated niobium expanded fine mesh anode and a Hastelloy® metal cathode. The cathode was placed in direct contact with the cation exchange membrane while the anode was spaced apart from the cation exchange membrane to allow oxygen formation. The cell was operated at a current density of 1.995 $KA/m_2$ and a cell temperature of 71° C. for a period of about 26 hours. The initial cell voltage was about 2 volts, with the final cell voltage being in the range of 10-12 volts. A perchloric acid solution containing 56.36 percent by weight of $HClO_4$ was produced. The results are illustrated in FIG. 3.

EXAMPLE 2

A solution of perchloric acid containing 30 percent by weight of $HClO_4$ produced by the method of Example 1 was fed to a crystallizer reactor of the type shown in FIG. 1. Added dropwise to the crystallizer reactor was a solution of ammonium hydroxide containing 28-30 percent by weight of $NH_4OH$ (Semiconductor grade, Olin Hunt Chemical Specialties, Company). The reaction mixture was maintained at a temperature of about 50°-60° C. by controlling the rate of addition of the ammonium hydroxide reactant. The reaction produced ammonium perchlorate crystals having sizes in the range of from about 30 to about 50 microns. The yield of ammonium perchlorate was 87%. The ammonium perchlorate crystals were recovered from the reactor and dried. A yield of 46% based on the wt. of $HClO_4$ was obtained. The ammonium perchlorate crystals were analyzed for metals by Plasma Atomic Absorption and for chloride and chlorate by Iodometric titration. The results are as follows:

| Analysis of Impurities in Ammonium Perchlorate Crystals | |  |
|---|---|---|
| Element or Group | Parts per Million | |
| Mo | 0.17 | |
| Cr | ND* | <0.5 |
| Zn | ND | <0.05 |
| Co | ND | <0.2 |
| Ni | 0.81 | |
| Fe | 0.292 | |
| Ta | ND | <0.75 |
| Si | ND | <0.4 |
| Mn | NM | <0.05 |
| Va | 0.114 | |
| Ti | 0.16 | |
| Cu | ND | <0.1 |
| Sr | ND | <0.5 |
| Na | 34 | |
| Cl | Trace | |
| $ClO_3$ | ND | |

*Not detected

EXAMPLE 3

Chloric acid (35.59 percent by weight) was fed into the anode chamber of the cell of Example 1 in which the cation exchange membrane was Nafion@ 117 (E. I. Dupont de Nemours & Company). Very dilute chloric acid of about 1 percent by weight was fed into the cathode chamber. The electrodes employed in the cell were a platinum clad niobium anode and a Hastelloy ® C-22 perforated cathode. The cell was operated at a current density of 6.0 $KA/m2$ and a cell temperature of 60° C. for a period of 19 hours. The initial cell voltage was about 4.6 volts, with the final cell voltage being about 6.4 volts. A perchloric acid solution of 42.06 percent by weight of $HClO_4$ was produced at a current efficiency of 85.03 percent.

EXAMPLE 4

Chloric acid (37.21 percent by weight) was fed into the anode chamber of the cell of Example 1 in which the cation exchange membrane was Nafion@ 117 (E. I. Dupont de Nemours & Company). Very dilute chloric acid of about 1 percent by weight was fed into the cathode chamber. The electrodes employed in the cell were a platinum clad niobium anode and a Hastelloy ® C-22 perforated cathode. The cell was operated at a current density of 8.0 $KA/m2$ and a cell temperature of about 78° C. for a period of 28 hours. The initial cell voltage was 6.8 volts with the final cell voltage being 7.21 volts. A perchloric acid solution of about 40.00 percent by weight of HClO₄ was produced. The current efficiency was 87.22 percent.

EXAMPLE 5

Chloric acid (35.59 percent by weight) was fed into the anode chamber of the cell of Example 1 in which the cation exchange membrane was Nafion@ 117 (E. I. Dupont de Nemours & Company). Very dilute chloric acid of about 1 percent by weight was fed into the cathode chamber. The electrodes employed in the cell were a platinum clad niobium anode and a Hastelloy ® C-22 perforated cathode. The cell was operated at a current density of 10.0 KA/m2 and a cell temperature of 90° C. for a period of 224 amp hours. The initial cell voltage was about 1.7 volts, with the final cell voltage being about 9.4 volts. A perchloric acid solution of 50.96 percent by weight of HClO₄ was produced at a current efficiency of 93.36 percent. The perchloric acid product had some residual yellow-green coloration which was subsequently removed by adding a small portion of 35% hydrogen peroxide. The results are recorded in Table I below.

TABLE I
ELECTROLYTIC PRODUCTION OF PERCHLORIC ACID

|         | AMP HOURS | % HClO₃ | % HClO₄ |
|---------|-----------|---------|---------|
| Initial | 0         | 35.18   | 0       |
|         | 28.78     | 32.93   | 7.95    |
|         | 47.22     | 30.50   | 9.07    |
|         | 67.50     | 28.64   | 12.85   |
|         | 86.20     | 24.77   | 16.92   |
|         | 107.25    | 21.45   | 22.19   |
|         | 132.70    | 26.90   | 27.98   |
|         | 151.65    | 12.79   | 33.35   |
|         | 173.71    | 7.99    | 39.49   |
|         | 193.67    | 3.99    | 44.77   |
|         | 207.80    | 1.70    | 47.46   |
|         | 219.28    | 0.64    | 50.15   |
| Final   | 224.00    | 0.00    | 50.96   |

EXAMPLE 6

The electrochemical cell of Example 5 was employed to electrolyze a 40% aqueous solution of chloric acid to perchloric acid at a series of different current densities. At each current density, the chloric acid solution was electrolyzed in the anode compartment for a time period sufficient to achieve a steady voltage reading for the electrolysis. The initial current density employed was about 0.25 KA/m₂. The current was then increased to provide a current density of 0.5 KA/m₂. The procedure was repeated for each of the current densities at 1,2,3,4, 4.5, 5, and 6 KA/m₂. The cell voltage was recorded and the anode voltage determined for each current density. The results are recorded on FIG. 2. As shown, in the process of the present invention, the anode voltage increases modestly with large increases in the current density. The cell voltage increases at a higher rate. However, the cell voltage for the process of the invention is considerably lower than those of electrochemical processes which produce perchloric acid from alkali metal chlorate salts where the cell voltage is at least 6-7 volts at current densities of 3 KA/m₂.

EXAMPLE 7

A solution of perchloric acid (335 g) containing 60 percent by weight of HClO₄, produced by the method of Example 1, was fed to a cooled stirred reactor. Added dropwise to the reactor were 235 g of a solution of ammonium hydroxide containing 28-30 percent by weight of NH₄OH (Semiconductor grade, Olin Hunt Chemical Specialties, Company). The reactor was cooled to maintain the reaction mixture at a temperature of about 50°-65° C. during the addition of the ammonium hydroxide reactant. Ammonium perchlorate crystals (233.8 g), produced in a yield based on perchloric acid of 87.25%, were filtered under vacuum. The filtrate (100 mls) was fed into a Pulvis Mini Spray Dryer having an inlet temperature of 150° C. and an outlet temperature of 74° C. The drying air was fed at a rate of 0.42 ml/min. Very fluffy, white fine crystals of ammonium perchlorate (12.02 g) were recovered from the dryer.

What is claimed is:

1. A process for producing ammonium perchlorate which comprises:
   (a) providing in an electrolytic membrane cell a cation exchange membrane with a cathode in direct contact with said cation exchange membrane and providing an anode spaced apart from the cation exchange membrane,
   (b) introducing an aqueous solution of chloric acid substantially free of ionic impurities into said electrolytic cell,
   (c) anodically oxidizing by electrolysis said aqueous solution of chloric acid to produce an aqueous solution of perchloric acid,
   (d) introducing the aqueous solution of perchloric acid into a crystallizing zone, and
   (e) reacting the aqueous solution of perchloric acid gaseous ammonia or an ammonia hydroxide solution to produce ammonium perchlorate crystals.

2. The process of claim 1 in which the chloric acid is anodically oxidized by electrolysis at a current density of from about 1 to about 12 KA/m².

3. The process of claim 2 in which the aqueous solution of chloric acid contains from about 30 to about 45 percent by weight of HClO₃.

4. The process of claim 2 in which an anodic potential sufficient to form nascent oxygen is maintained.

5. The process of claim 1 in which the crystallizing zone is maintained at a temperature of from about 40° to about 95° C. at substantially atmospheric pressure.

6. The process of 4 accomplished by maintaining an anode potential at about 2 volts or greater.

7. The process of 1 accomplished by maintaining an anode in the anode compartment spaced apart from the cation exchange separator at from about 0.05 to about 4 centimeters.

8. The process of 1 accomplished by maintaining an anode potential at about 2 volts or greater.

* * * * *